United States Patent [19]
Schmidt et al.

[11] 3,835,239
[45] Sept. 10, 1974

[54] CURRENT FEEDING ARRANGEMENT FOR ELECTRICAL APPARATUS HAVING LOW TEMPERATURE COOLED CONDUCTORS

[75] Inventors: Fritz Schmidt, Erlangen; Günther Mätthaus, Spardorf; Peter Massek, Forchheim, all of Germany

[73] Assignee: Siemens Aktiengesellschaft, Munich, Germany

[22] Filed: Dec. 13, 1972

[21] Appl. No.: 314,564

[30] Foreign Application Priority Data
Dec. 27, 1971  Germany............................ 2164706

[52] U.S. Cl. ...... 174/15 BH, 174/15 C, 174/DIG. 6
[51] Int. Cl. ............................................. H01v 11/00
[58] Field of Search.. 174/15 R, 15 C, 16 R, 15 BH, 174/DIG. 6, 17 R, 176 F; 165/105; 62/514, 55.5, 45

[56] References Cited
UNITED STATES PATENTS

| | | |
|---|---|---|
| 2,221,670 | 11/1940 | Cooper............................ 174/17 GF |
| 2,943,134 | 6/1960 | Liao et al.......................... 174/16 R |
| 2,989,577 | 6/1961 | Berg................................... 174/15 R |
| 3,522,361 | 7/1970 | Kafka................................. 174/15 C |
| 3,542,937 | 11/1970 | Dammann et al................ 174/15 R |
| 3,563,309 | 2/1971 | Basiulis............................. 165/105 |
| 3,695,057 | 10/1972 | Moission-Frankhauser...... 174/15 R |

*Primary Examiner*—A. T. Grimley
*Attorney, Agent, or Firm*—Kenyon & Kenyon Reilly Carr & Chapin

[57] ABSTRACT

A current feeding arrangement for a superconductor, having a cooled standard conductor connected to it. The invention is comprised of adding an electronegative gas, a vaporous radical or Freon to the gaseous cooling medium, which increases the dielectric strength of the gaseous cooling medium making the current feeding arrangement suitable for high voltages.

8 Claims, 2 Drawing Figures

CURRENT FEEDING ARRANGEMENT FOR ELECTRICAL APPARATUS HAVING LOW TEMPERATURE COOLED CONDUCTORS

BACKGROUND OF THE INVENTION

1. Field of the Invention

The invention is concerned with a current feeding arrangement for electrical apparatus having conductors cooled to a low temperature; more particularly, it is concerned with a current feeding arrangement for superconductors, the end of the superconductors being connected to a standard conductor, cooled by a gaseous cooling medium.

2. Description of the Prior Art

In electrical apparatus having conductors, for example, in cables, coils or machines, electric current must frequently be fed from a point at a higher temperature, particularly room temperature to the superconductor, which is cooled to a temperature below its transition temperature. Because the superconductor loses its superconductivity at a temperature far below room temperature, an electrically normal-conductive metal, like aluminum or copper, is used to bridge the temperature difference, and is connected with the superconductor at a point maintained at a temperature below the transition temperature of the superconductor. The standard conductor is therefore gradually cooled in stages, up to the connection point.

The end of the superconductor held below its transition temperature, can, for example, be arranged in a bath of a cryogenic medium, such as a helium bath. The standard conductor is then comprised of laminations, wires or also grids at the connection point. Such a design is shown in "Review of Scientific Instruments," vol. 38, No. 12 (Dec. 1967), p. 1776 to 1779. Due to the thermal losses at the junction, the liquid helium evaporates and the cold helium gas rises through the conductor laminations, or the conductor grid and removes the joulean heat and the heat flowing in from the standard conductor. In the process, the helium gas is warmed up to approximately room temperature. In order to increase the removal of heat, the helium bath can also be provided with a supplemental heat source, or additional helium gas can be fed into the current feeding arrangement. At the upper junction of the standard conductor with the current supply, the helium gas is collected and returned to a refrigeration machine for re-liquefication. Because the heat content of the gaseous cooling medium is well utilized in such exhaust gas-cooled current feeds, they require only a relatively small cooling effort.

If, however, high transmission rates are to be obtained, at which superconducting cables become economical, one is compelled to use correspondingly high voltages of 110 kV or even 220 kV and higher. This type of current feed utilizes contact at one end with the highly cooled conductor, while the other end to which the conventional current supply is connected, is at a higher temperature, preferably room temperature. The cooling medium therefore flows along the individual conductors of the current feed and is in close contact with the high voltage conductor. The refrigeration machine for the cooling medium, however, is generally at ground potential. To conduct the gas of the cooling medium away from the high-voltage potential by an insulating tube is not directly possible because helium at about 300° K has a very low breakdown voltage, which is further reduced if the gas is in motion.

SUMMARY OF THE INVENTION

This invention is therefore based on the discovery that the breakdown voltage of the gaseous cryogenic media used as coolants can be increased through additional measures which substantially reduce the ionization of the gas. The invention is comprised of adding an electronegative gas, an electronegative vapor, an organic radical or its inorganic analog to the cooling medium. This additional component captures the electrons liberated during the ionization process so that they are adsorbed by the molecules of the added medium and are thereby lost to further ionization. Through this bonding of the free electrons a corresponding increase in the breakdown voltage is obtained.

Suitable for use as the electronegative gas are preferably gaseous or vaporous fluorine F, chlorine Cl, bromine Br or iodine I or a gaseous compound which contains at least one of these elements, particularly sulfur hexafluoride $SF_6$. Also suitable are the so-called safety refrigerants Freons, as far as they contain such elements. These are, for example, the compounds monofluortrichlormethane $CFCl_3$ and difluordichlormethane $CF_2Cl_2$ as well as trifluormonochlormethane $CF_3Cl$. The inorganic analog of a radical, such as nitrogen dioxide $NO_2$ is also suitable as an additive. Additionally, pure oxygen $O_2$ can be added as an electronegative gas. By the addition of these gases the dielectric strength of the vaporous cooling medium is increased to the extent that the gas mixture can be conducted away from the high-voltage potential to ground through an insulating tube of economically justifiable length.

At the ground potential, the added gas or vapor can then be removed by freezing and the purified cooling gas fed to the refrigeration machine. Cooling traps are suitable for the freezing step. The separation of the gas mixture at ground potential is also possible by using increased pressure, generated, for example, by a compressor. Sulfur hexafluoride liquefies at a temperature of 300° K and a pressure of 24 $Kg/cm^2$. At 273°K it liquefies at a pressure of only 13.5 $Kg/cm^2$. In a pressure tank, the liquefied sulfur hexafluoride collects at the bottom and can be drawn off into a tank maintained at the same pressure and returned to circulation.

BRIEF DESCRIPTION OF THE DRAWING

To explain the invention in further detail, reference is made to the drawing, which illustrates an embodiment of a current feeding arrangement constructed according to the invention.

DESCRIPTION OF THE PREFERRED EMBODIMENT

Figure 1:
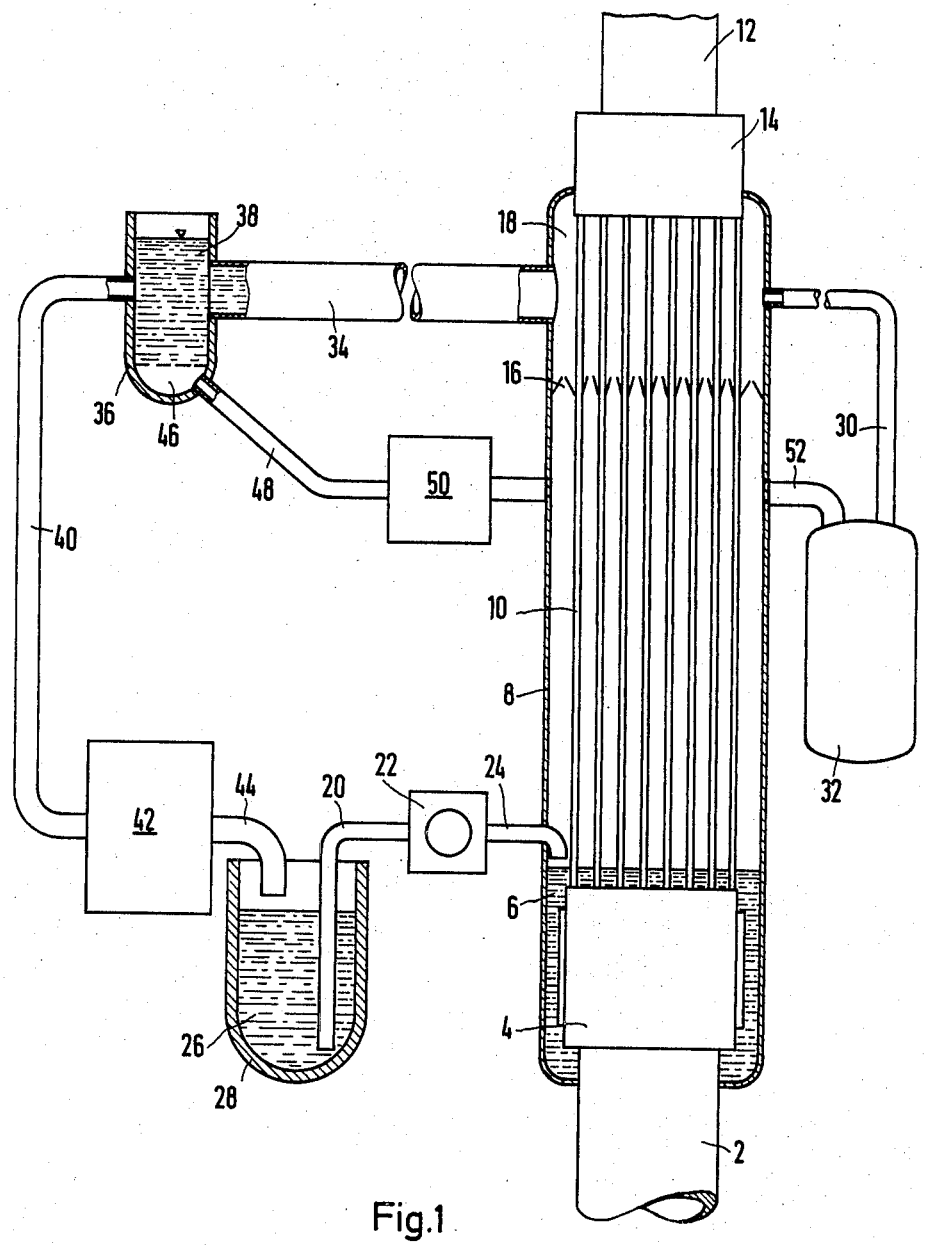

In FIG. 1 the end of the superconductor 2 is connected by member 4 to a standard conductor and a cooling medium bath 6 having a container 8. The container 8 also encloses the individual conductors 10, which connect the end 12 of the standard conductor with its terminal 14.

In container 8 nozzles 16 are also located between the individual conductors formed from conductor laminations 10, and the wall of the container. These nozzles close off a gas cushion space 18. An insulating tube 20 is connected by coolant pump 22 and coolant pipe 24 with a cooling medium 26 located in tank 28. This cooling medium 26 may, for example, be helium. A feed pipe 30 connects gas cushion space 18 with gas tank 32 which serves to receive a medium which is to be added to the cooling gas. A discharge pipe 34 is arranged between the gas cushion space 18 and a cooling trap 36, which contains a cryogenic medium 38, such as nitrogen. In the lower portion of the cooling trap 36, the frozen liquefied medium 46 collects; this is connected by pipeline 48, compressor 50 and a pressure line 52 with the gas tank 32.

The junction 4 between the laminations 10 of the high-voltage conductor 12 and the superconductor 2 is situated in the boiling helium of bath 6. Because of the joulean heat of the current-carrying laminations 10 and the heat inflow through the connection 14 of the normal conductor 12, part of the helium evaporates. The cold gas rises between the laminations 10, cooling them, and enters into the gas cushion space 18 through nozzles 16. During its travel to the nozzles 16, the cooling gas assumes a temperature of about 300°K. From tank 32 an electronegative, gaseous medium enters through line 30, into the gas cushion space 18, where it is mixed with the helium gas. The nozzles 16 prevent the added medium from entering into the lower, colder zones of container 8, because it might be liquefied by freezing in these zones and thereby become ineffective.

The mixture of the cooling medium and the added medium flows through discharge pipe 34 to cooling trap 36, which is already at ground potential. There the gas mixture is cooled by liquid nitrogen 38 and the added medium is frozen out. Thus the purified helium is returned to vessel 28 through pipeline 40 and refrigeration machine 42 as well as through the additional pipeline 44. From this vessel 28 the liquid helium is pumped by means of pump 22 through lines 20 and 24 into bath 6.

The dielectric strength of the liquid helium, which is about 20 to 30 kV/mm, is substantially higher than the dielectric strength of the evaporated helium. The refilling of the helium from vessel 28 into bath 6 therefore presents no difficulty. The helium evaporated from the bath 6 rises upward through laminations 10 while its temperature increases according to the heat absorbed and the evaporated helium is ionized by the electric field. While the ionization voltage of helium is relatively high (24.85 V), helium can be ionized in steps and the metastable states generated have very long lives. This results in a corresponding reduction in the breakdown voltage, as positive helium ions and free electrons are formed, accelerated in the electric field and in turn ionize other helium atoms. By admixing the added medium in the gas cushion space 18, these free electrons are now bound to molecules of the added medium, forming a negative ion of low mobility. These electrons are therefore eliminated for the further ionization of the helium.

Compounds having unsaturated, electron shells in their atomic structure are suitable for additives. A measure of the tendency of the adsorption of the electrons is the electron affinity, which indicates the energy of the electron to be adsorbed.

Figure 2:
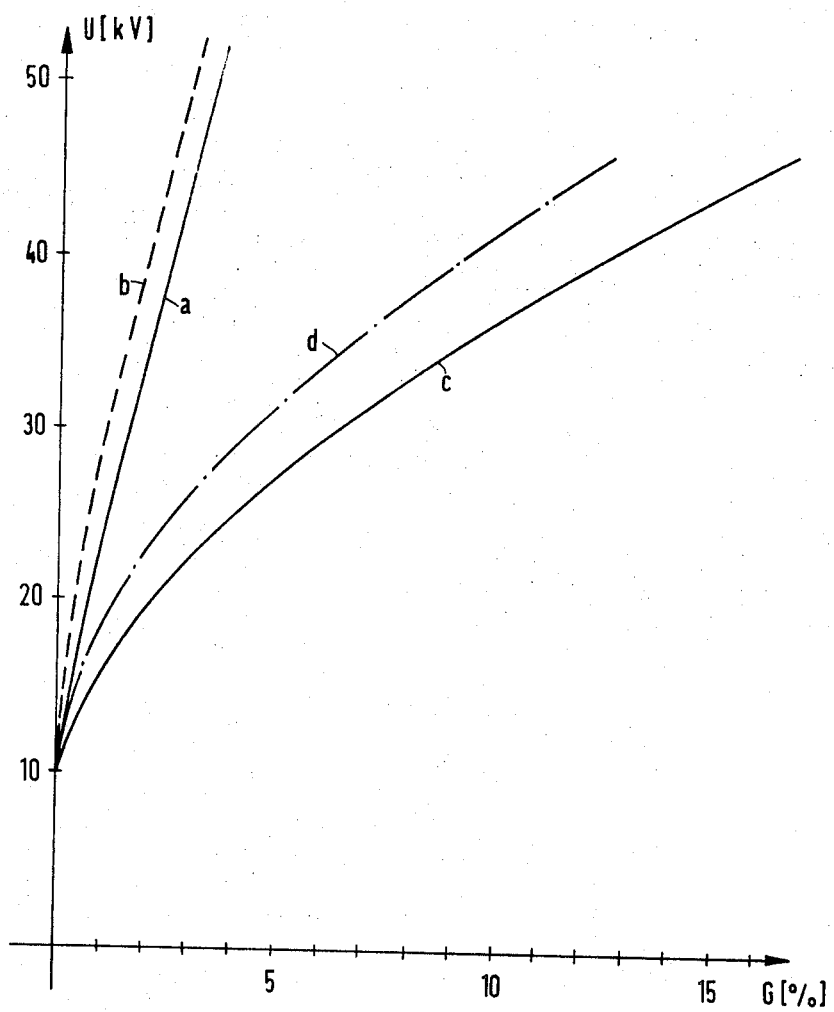
FIG. 2 illustrates diagrammatically the effect of the added medium upon the cooling gas.

In diagrammatic form in FIG. 2, the breakdown voltage U in kV is illustrated as a function of the content G of the added medium as a percentage by volume. In the example, helium is chosen as the cooling medium with sulfur hexafluoride $SF_6$ and oxygen $O_2$ as the added media. The breakdown voltage of pure helium is approximately about 10 $kV_{rms}$ in the current feeding arrangement shown in FIG. 1. If different quantities of sulfur hexafluoride $SF_6$ are added, an addition of, for instance, 3½ percent by volume increases the dielectric strength to about 50 kV for a flow rate of about 300 liters per hour of helium coolant. With a gas flow rate of 2,500 liters per hour the stated value of 50 kV is reached at a content of about 3 percent by volume of sulfur hexafluoride, as will be seen from the dashed curve b in FIG. 2. If, for example, oxygen $O_2$ is added instead of sulfur hexafluoride, one obtains with an oxygen content of 2 percent in helium an increase in the breakdown voltage to approximately 20 kV, and with a content of 16 percent, an increase in the breakdown voltage to approximately 45 kV, as shown by Curve c, at a helium flow rate of about 300 liters per hour. If the helium flow rate is increased to 2,500 liters/hr, the breakdown voltage of 45 kV is reached at a content of about 12 percent of oxygen $O_2$, as shown by the dash-dotted curve d.

The admixture of oxygen $O_2$ may be advisable in the case of light loading of the current feeding arrangement, because the gas temperature in the gas cushion space 18 can then shift to lower ranges. In that case, sulfur hexafluoride having a melting point of −50.7°C may not be usable, but oxygen $O_2$ having a boiling point of −163°C is still highly suitable. The added oxygen can also be frozen with a nitrogen charge in the cooling trap 36.

A particularly advantageous further embodiment of the current feeding arrangement according to this invention is obtained if one uses several cooling traps, with each of which a separate circulation can be associated. If, in place of the cooling trap 36 shown in the embodiment of FIG. 1, two cooling traps are provided, they can be alternately operated. The cooling trap that is not in operation can be warmed up and the gas returned to the supply tank by a compressor. Intermittent gas circulation of the added medium is therefore possible.

In the embodiment described, a current feeding arrangement for a superconductor cooled by helium is described. It should be understood, however, that current feeding arrangements for low temperature cooled conductors can also be designed according to the invention, with other cooling media such as hydrogen.

What is claimed is:

1. In a current feed arrangement wherein a cooled superconductor at high voltage has its end coupled to a normal conductor with the coupling being cooled by a cryogenic gas, which gas is circulated and cooled in a first cooling circuit, a portion of which is at ground potential, means to improve the breakdown voltage of said cryogenic gas comprising:
   a. a superconductor;
   b. a standard conductor;
   c. a plurality of laminations connecting the standard conductor and superconductor;
   d. a container surrounding said laminations;
   e. means to supply cryogenic liquid cooling at bottom of said container as a coolant bath;

f. means to add an additional gas to the cryogenic gas at the coupling, said means including a second separate cooling circuit for said additional gas; and g. a plurality of nozzles positioned in said laminations to form a gas cushion space between the space where said additional gas is added and a zone of lower temperature.

2. A current feeding arrangement for electrical apparatus having a superconductor cooled to a cryogenic temperature by a cryogenic liquid coolant at the connection between a standard conductor and a superconductor comprising:

a. a superconductor;

b. a standard conductor;

c. a plurality of laminations connecting the standard conductor and superconductor;

d. a container surrounding said laminations;

e. means to supply a cryogenic liquid coolant to the bottom of said container as a coolant bath;

f. means to add an additional gas to the liquid coolant which gasifies in said container; and g. a plurality of nozzles positioned in said laminations to form a gas cushion space between the space where said additional gas is added and a zone of lower temperature.

3. Apparatus according to claim 2 and further including:

a. a separate circulation circuit for the added gas comprising a pipe connecting said container at a location at the end of the laminations adjacent the standard conductor to a coolant means for said cryogenic liquid coolant, said circuit having a coolant trap positioned therein for liquefying said added gas, a second pipe for removing the liquefied added gas from the cooling trap and connected to a compressor and a gas tank to regasify the liquefied added gas, a third pipe being connected to the container at a location near the end of the laminations adjacent to the standard conductor to reintroduce the added gas to the area adjacent the upper portion of the laminations from said gas tank; and b. said means to supply said cryogenic liquid coolant further comprising a refrigerator means connected to the cooling trap for removing said cryogenic liquid coolant from said cooling trap and pumping means connected to said refrigeration means for returning said cryogenic liquid coolant to said coolant bath for said superconductor.

4. A method of improving the breakdown voltage of helium used as a gaseous cryogenic media in a current feeding arrangement having superconductors cooled to a superconductive temperature, one end of which arrangement is connected to a standard conductor, the other end of which is connected to a superconductor and both ends of which are cooled by the cryogenic gaseous cooling medium comprising the step of adding to the cryogenic gaseous cooling medium gaseous oxygen.

5. A method for improving the breakdown voltage of a gaseous cryogenic media in a current feeding arrangement for electrical apparatus having superconductors cooled to a super conductive temperature, one end of which arrangement is connected to a standard conductor, the other end of which is connected to a superconductor and both ends of which are cooled by the cryogenic gaseous cooling medium comprising the step of adding to the cryogenic gaseous cooling medium gaseous nitrogen dioxide.

6. An improved method for increasing the breakdown voltage of a gaseous cryogenic medium used in a current feeding arrangement for electrical apparatus in which superconductors are cooled to a cryogenic temperature by a cryogenic liquid coolant in a connection between a standard conductor and a superconductor comprising the steps of:

a. forming the connection between the standard conductor and superconductor as a plurality of laminations within a container;

b. adding the cryogenic liquid coolant to said container at one end;

c. adding an additional gas to the gasified liquid coolant which forms in the laminations; and d. forming nozzles within said laminations to form a gas cushion space for the additional gas between the space where said additional gas is added and a zone of lower temperature.

7. The invention according to claim 6, wherein said additional gas consists of one of the group consisting of gaseous fluoride, chlorine, bromine, iodine and a gaseous compound containing at least one of these elements.

8. The method according to claim 6, wherein said additional gas consists of gaseous sulfur hexafluoride.

* * * * *